US012607460B2

(12) United States Patent     (10) Patent No.:   US 12,607,460 B2

Taccini     (45) Date of Patent:    Apr. 21, 2026

(54) DETECTOR DEVICE, FOR MEASURING THE CALIBRE OF CERAMIC TILES OR SLABS

(71) Applicant: SYSTEM CERAMICS S.P.A., Fiorano Modenese (IT)

(72) Inventor: Stefano Taccini, Formigine (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 151 days.

(21) Appl. No.: 18/560,467

(22) PCT Filed: May 18, 2022

(86) PCT No.: PCT/IB2022/054622

§ 371 (c)(1),
(2) Date: Nov. 13, 2023

(87) PCT Pub. No.: WO2022/248977

PCT Pub. Date: Dec. 1, 2022

(65) Prior Publication Data

US 2024/0255276 A1    Aug. 1, 2024

(30) Foreign Application Priority Data

May 25, 2021   (IT) ........................ 102021000013526

(51) Int. Cl.
    *G01B 11/25*       (2006.01)
    *G01B 11/16*       (2006.01)

(52) U.S. Cl.
    CPC ........ *G01B 11/2513* (2013.01); *G01B 11/167* (2013.01); *G01B 11/2522* (2013.01)

(58) Field of Classification Search
    CPC ....... G01B 11/24; G01B 11/25; G01B 11/026; G01B 11/0608; G01B 11/2518;

(Continued)

(56) References Cited

U.S. PATENT DOCUMENTS 8,849,620 B2 * 9/2014 Regan .................... G06F 30/00
                                      702/167
9,630,731 B2    4/2017 Toro
           (Continued)

FOREIGN PATENT DOCUMENTS

CN      101975557 A     2/2011
CN      109520441 A * 3/2019 ............. G01B 11/25
          (Continued)

OTHER PUBLICATIONS

International Search Report and Written Opinion in International Application No. PCT/IB2022/054622, Search Completed: Jul. 11, 2022, Date of Mailing of International Search Report: Jul. 21, 2022, 10 pages.

*Primary Examiner* — Michael P Stafira

(74) *Attorney, Agent, or Firm* — Chrisman Gallo Tochtrop LLC

(57) ABSTRACT

A detector device for ceramic tiles or slabs that includes a resting plane provided with a longitudinal direction and a laser emitter arranged to emit a flat laser beam on the resting plane so as to illuminate a detection line on the resting plane. The laser beam lies on a plane having a first inclination with respect to the transport plane and the laser beam has a second inclination with respect to the longitudinal direction. The detector device also includes a camera provided with a vision cone having a longitudinal axis, which longitudinal axis has an inclination with respect to the transport plane; the vision cone faces the transport plane so as to include the detection line, wherein the laser emitter and the camera are located on the same side of the transport plane.

11 Claims, 3 Drawing Sheets

(58) Field of Classification Search

CPC ....... G01B 11/26; G01B 11/245; G01B 11/22; G01B 11/08; G01B 11/2522; G01B 11/00; G01B 11/303; G01B 11/2433; G01B 11/2504; G01B 11/002; G01B 15/00; G01B 11/254; G01B 11/005; G01B 11/06; G01B 2290/35; G01B 9/02004; G01B 9/02057; G01B 9/02083; G01B 11/2425; G01B 11/2527; G01B 21/042; G01B 9/00; G01B 9/0201; G01B 9/02091; G01B 11/2545; G01B 21/08; G01B 5/0014; G01B 9/02007; G01B 11/2513; G01B 11/30; G01B 11/043; G01B 11/0691; G01B 11/2441; G01B 11/306; G01B 5/0018; G01B 11/022; G01B 9/02; G01B 11/02; G01B 11/028; G01B 11/10; G01B 11/27; G01B 21/045; G01B 2210/56; G01B 9/02059; G01B 9/02069; G01B 11/0675; G01B 11/2408; G01B 11/272; G01B 21/02; G01B 21/20; G01B 2290/45; G01B 2290/70; G01B 5/18; G01B 5/28; G01B 9/02002; G01B 9/02012; G01B 9/02014; G01B 9/02015; G01B 9/02081; G01B 9/0209; G01B 11/0625; G01B 11/0641; G01B 11/105; G01B 11/12; G01B 11/14; G01B 11/2416; G01B 11/2509; G01B 11/2531; G01B 15/02; G01B 21/085; G01B 21/16; G01B 2290/30; G01B 5/004; G01B 9/02011; G01B 9/02018; G01B 9/02024; G01B 9/02027; G01B 9/02028; G01B 9/0203; G01B 9/02043; G01B 9/02075; G01B 9/02079; G01B 9/02084

See application file for complete search history.

(56) References Cited

U.S. PATENT DOCUMENTS

| | | | | |
|---|---|---|---|---|
| 2013/0132038 | A1 | | 5/2013 | Regan et al. |
| 2013/0321582 | A1 * | 12/2013 | Huang ............... | G01B 11/2527 |
| | | | | 348/46 |
| 2014/0362079 | A1 | | 12/2014 | Regan et al. |
| 2019/0360797 | A1 | | 11/2019 | Regan et al. |
| 2021/0116668 | A1 * | 4/2021 | Nemoto ............. | G01B 11/2518 |

FOREIGN PATENT DOCUMENTS

| | | | | | |
|---|---|---|---|---|---|
| CN | 110388881 | A | * | 10/2019 | ............. G01B 11/24 |
| CN | 112113511 | B | * | 11/2021 | ............... G06T 7/13 |
| CN | 215179758 | U | * | 12/2021 | |
| CN | 115390087 | A | * | 11/2022 | ........... G01S 7/4817 |
| EP | 3076162 | A1 | * | 10/2016 | .......... G01B 11/306 |
| EP | 3165483 | A1 | | 5/2017 | |
| JP | 5737453 | B2 | | 6/2015 | |
| JP | 2017146246 | A | * | 8/2017 | |
| WO | WO-2016157000 | A1 | * | 10/2016 | ........ G01N 21/8901 |
| WO | WO-2021203683 | A1 | * | 10/2021 | ............. G01N 21/88 |

* cited by examiner

DETECTOR DEVICE, FOR MEASURING THE CALIBRE OF CERAMIC TILES OR SLABS

The present invention relates to a detector device, in particular for measuring the calibre of ceramic tiles or slabs.

In the ceramic tile production sector, the term calibre refers to the actual measurements of a tile at the end of the production process. The detection of the actual measurements of the tiles is necessary, since these measurements do not correspond to the nominal or expected measurements at the end of the process, for various reasons, due to various defects and in particular to the deformations deriving from the firing process.

Currently, the calibre of the tiles is measured using optical type sensors. In some cases, such sensors comprise a projector and a receiver, positioned respectively above and below the tiles, at the four corners. The tiles advance on a transport plane and, when the four corners simultaneously transit at the four sensors, the calibre measurement is performed. This type of measurement requires the use of transport planes in the form of motorised belts, as the projector and the receiver of each sensor must be able to directly see each other. However, the use of belt transport planes is problematic in the event of large format tiles, as the latter, resting only on the belts, tend to inflect and bend downwards, deforming in a manner which can be unacceptable.

Furthermore, as is known, the measurement system summarised above is not capable of detecting whether the calibre of the upper face of the tiles is different with respect to the calibre of the lower face, since, in any event, it is capable of detecting only the largest measurement between the two.

Other measurement systems involve the use of a laser beam, which is projected towards the tiles, and a camera, which is used to detect the image of the laser beam striking on the tiles. The image of the beam is then processed to detect the discontinuities which are defined on the surface and at the edges of the tiles, and to take the necessary measurements. In other similar measuring systems, it is possible to use translucent conveyor belts, which offer complete support to the tiles. Even in this case, however, the system is not capable of detecting whether the calibre of the upper face of the tiles is different with respect to the calibre of the lower face, since the camera is not capable of seeing the edges of the opposite face with respect to that directly facing the camera itself. An example of such a measuring system is described in document CN101975557.

The object of the present invention is to provide a detector device, in particular for measuring the calibre of ceramic tiles, which allows to overcome the shortcomings of the current measuring systems.

An advantage of the measuring device according to the present invention is that of allowing the measurement of the calibre of both faces of the tiles.

Another advantage of the measuring device according to the present invention is that of operating correctly even in the presence of transport planes in the form of continuous and opaque motorised belts, i.e., not translucent or transparent.

Additional features and advantages of the present invention will become more apparent from the detailed description that follows of an embodiment of the invention in question, illustrated by way of non-limiting example in the appended figures, in which.

Figures 1, 2:
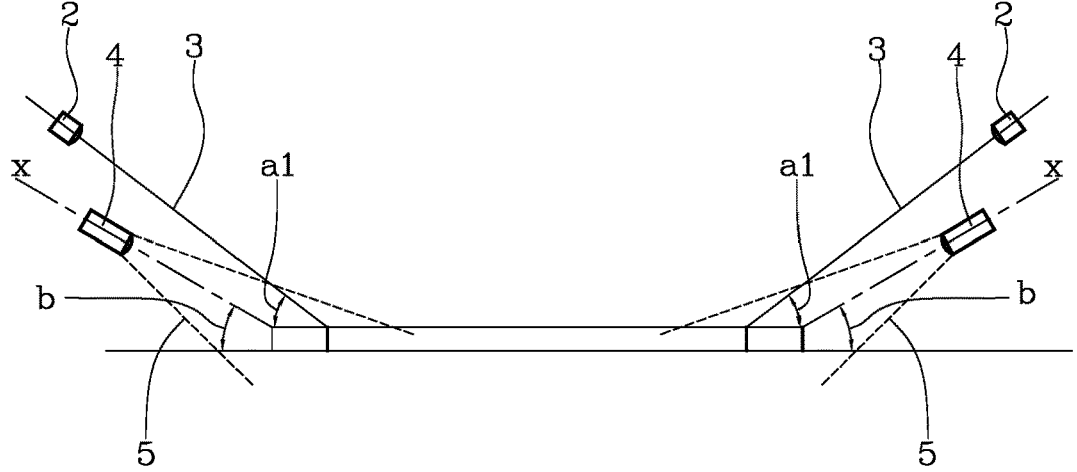
FIG. 1 shows a schematic plan view of a measuring device comprising four detector devices according to the present invention.
FIG. 2 shows a view from below of FIG. 1.
Figure 3:
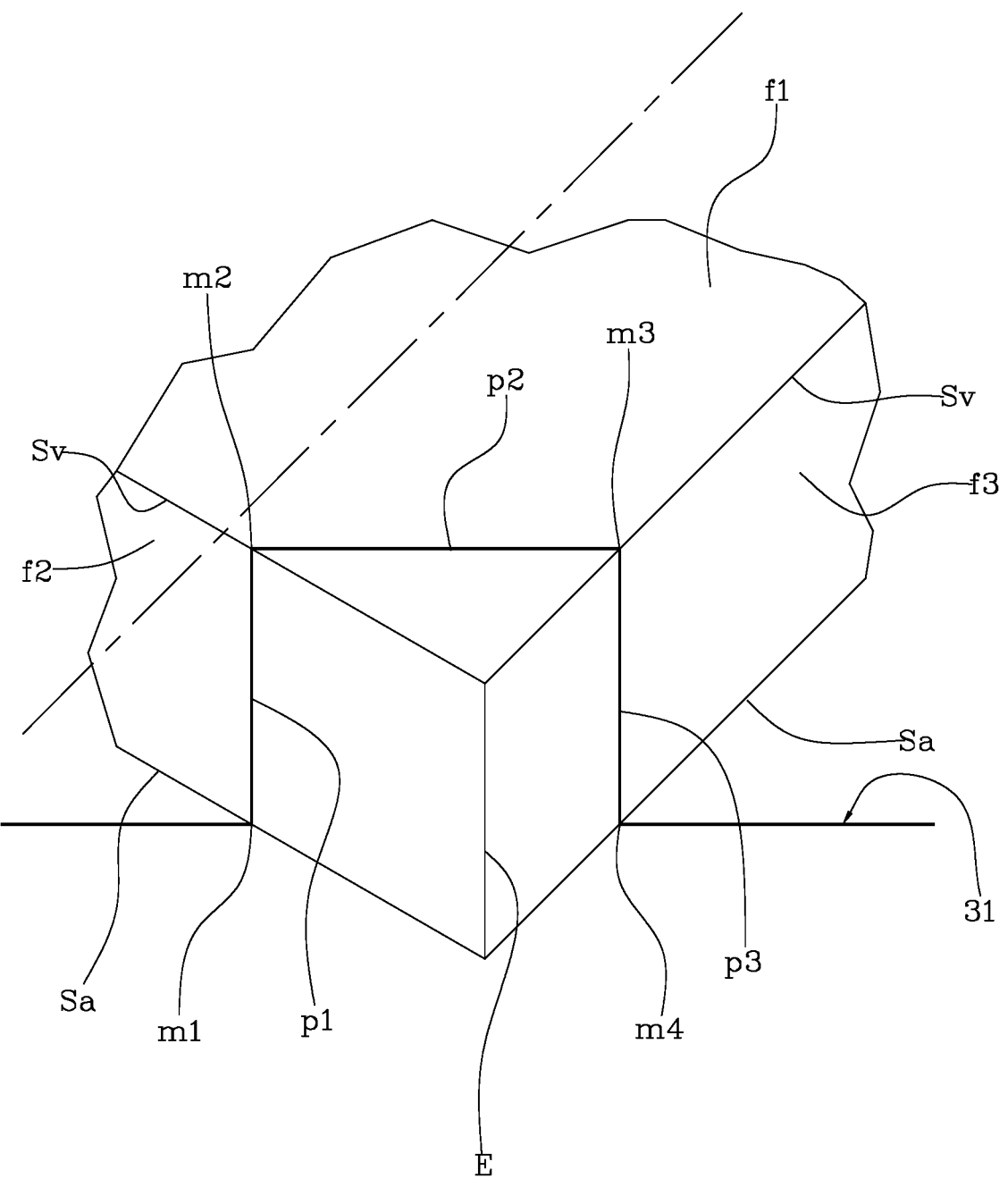
FIG. 3 shows a detail of a corner of a tile.

The detector device according to the present invention is particularly suitable for detecting structural information on a ceramic tile or slab.

In the following description, ceramic tile or slab means a product, realised with the well-known ceramic technology process which involves the essential steps of pressing a layer of granular or powdered ceramic material and the subsequent firing of the pressed layer, which has a flat and flattened slab shape. The tile typically has smaller dimensions with respect to the slab. For the sake of brevity, in the following description reference will only be made to ceramic tiles, which regardless intends to also comprise ceramic slabs in the name used.

The detector device according to the present invention comprises a resting plane (T), provided with a longitudinal axis (Y). Advantageously, for reasons which will be clarified later, the resting plane (T) can be made in the form of a continuous belt, to offer an extended and complete support to the tiles (P). Furthermore, the resting plane (T) can be made of any opaque material, known in the sector for the construction of a movable transport plane. Preferably, the resting plane (T) is movable along an advancement direction parallel to the longitudinal direction (Y). Preferably, the resting plane (T) is horizontal, and such an orientation will be referred to in the following description. The detector device could also operate in the case of a non-horizontal resting plane (T).

A tile (P) has a rest face, i.e., a face at which it rests on the resting plane (T), a visible face (f1), parallel and opposite the rest face, i.e., an upper face (f1) in the case represented in which the resting plane (T) is horizontal. The tile (P) also has a side surface (f2,f3) which joins the rest face and the visible face (f1) and is perpendicular to the latter. The side surface (f2,f3) is essentially the side edge of the tile (P). In the represented and most common case of a rectangular or square tile, which has four edges (E), the side surface is defined, at each edge (E), by two side faces (f2,f3) which join at the edge (E) itself. Each side face (f2,f3) is delimited by a visible edge (Sv), which joins it to the visible face (f1), and by a rest edge (Sa), which joins it to the rest face.

The detector device according to the present invention comprises a laser emitter (2), arranged to emit a flat laser beam (3) which strikes the resting plane (T), so as to illuminate a detection line (31) on the resting plane (T). In essence, the detection line (31) defines the area, shaped as a very thin band, in which the laser beam (3) strikes the resting plane (T).

Preferably, the laser emitter (2) and the resting plane (T) are in relative motion with each other along the longitudinal direction (Y). Thereby, a tile (P) arranged resting on the resting plane (T) is scanned by the laser beam (3), i.e., the tile (P) progressively crosses the detection line (31). In other words, instant by instant the detection line (31) is in a different position on the tile (P).

In a preferred embodiment, the relative motion along the longitudinal direction (Y) is obtained by arranging the movable resting plane (T) along the longitudinal direction (Y). The laser emitter (2) is instead preferably static. In a less preferred embodiment, the resting plane (T) is static, while the laser emitter (2) moves along the longitudinal direction (Y), or both are in motion along the longitudinal direction (Y).

The laser beam (3) lies on a plane which, on a plane perpendicular to the resting plane (T) and parallel to the longitudinal direction (Y), forms an angle (a1), i.e., has a first inclination (a1) with respect to the transport plane (T). In other words, considering a reference plane perpendicular to the resting plane (T) and parallel to the longitudinal direction (Y), the intersection between the latter and the plane containing the laser beam (3) has a first inclination (a1) with respect to the intersection between said reference plane and the transport plane (T).

Furthermore, the laser beam (3) forms an angle (a2) on the resting plane (T), i.e., it has a second inclination (a2) with respect to the longitudinal direction (Y). That is, the detection line (31) has a second inclination (a2) with respect to the longitudinal direction (Y).

The detector device according to the present invention also comprises a camera (4). The term camera means a device capable of acquiring images and/or videos of a framed subject.

The camera (4) is provided with a vision cone (5) which has a longitudinal axis (X). Vision cone substantially means the space, in the form of a cone or trunk of a cone, within which the camera (4) is capable of framing an object. That is, an object located within the vision cone (5) can be framed by the camera (4). The longitudinal axis (X) of the vision cone (5) has an inclination (b) with respect to the resting plane (T). Furthermore, the vision cone (5) is facing the resting plane (T) so as to include the detection line (31). In particular, the camera (4) is arranged so as to frame at least one portion of both side faces (f2,f3) adjacent to the same edge (E) of a tile, when the latter is arranged on the resting plane (T).

If the camera (4) is arranged to acquire images, preferably the camera (4) acquires one or more images at predetermined instants. Each image then reproduces a different position of the detection line (31) on the tile (P), since the latter is in relative motion with respect to the laser emitter along the longitudinal direction (Y).

If the camera (4) is arranged to acquire a film, preferably one or more frames or static images are extracted from the latter at predetermined instants. Also in this case, each frame or static image reproduces a different position of the detection line (31) on the tile (P), since the latter is in relative motion with respect to the laser emitter along the longitudinal direction (Y).

The laser emitter (2) and the camera (4) are located on the same side of the resting plane (T). In particular, the laser emitter (2) and the camera (4) are located on the side of the resting plane (T) on which the tiles (P) are intended to rest.

The first inclination (a1) of the laser beam (3) is different from 90°. For example, the first inclination (a1) is comprised between 30° and 70°. Preferably, the first inclination is about 45°.

The second inclination (a2) of the laser beam (3) is different from 90°. For example, the second inclination (a2) is comprised between 30° and 70°. Preferably, the first inclination is about 45°.

Preferably, but not necessarily, the inclination (b) of the longitudinal axis (X) is different from 90°, to improve the quality of the detection performed by the camera (4). For example, the inclination (b) of the longitudinal axis (X) is comprised between 30° and 70°. Preferably, the inclination (b) of the longitudinal axis (X) is about 45°. The longitudinal axis (X) of the vision cone (5) has, on the resting plane (T), a second inclination (b2) with respect to the longitudinal direction (Y). Preferably, but not necessarily, the second inclination (b2) is different from 90°.

By virtue of the placement of the laser emitter (2) and the camera (4), and the inclinations of the laser beam (3) and the longitudinal axis (X) of the vision cone (5), the camera (4) is capable of detecting a portion of the visible face (f1) of at least one tile (P), arranged resting on the resting plane (T) within the vision cone (5). Furthermore, by virtue of the inclination of the longitudinal axis (X), the camera (4) is also capable of detecting at least one portion of the side surface (f2,f3) of the tile (P). This allows the camera (4) to detect the path of the detection line (31) when the latter strikes the tile (P).

By virtue of the inclinations (a1,a2) of the laser beam (3), if a tile (P) is arranged on the resting plane (T) so that none of the sides is parallel to the detection line (31), the detection line (31) strikes the tile (P) defining a profile comprising a first section (p1), arranged on a first side face (f2) adjacent to an edge (E), a second section (p2), arranged on the visible face (f1), and a third section (p3) arranged on a second side face (f3) adjacent to the same edge (E). The profile (p1,p2, p3) also defines at least four bending points (m1,m2,m3,m4) which delimit the three sections (p1,p2,p3).

If the resting plane (T) and the laser emitter (2) are in relative motion along the longitudinal direction (Y), at each instant the detection line (31) strikes a different area of the tile (P), and at each instant of time then defines a profile (p1,p2,p3) different from another instant of time. That is, for each instant of time in which the detection line (31) is on the tile (P) it is possible to identify a profile (p1,p2,p3) which defines the four bending points (m1,m2,m3,m4). In the following description, reference will be made to a profile (p1,p2,p3) and to the corresponding bending points (m1,m2, m3,m4) for a generic instant of time, but the indications given and the considerations carried out are valid and can be extended to a profile (p1,p2,p3) and to the corresponding bending points (m1,m2,m3,m4) identified and detected for any other instant of time.

A first bending point (m1) and a second bending point (m2) are arranged at the ends of the first section (p1). The first point (m1) is positioned on a rest edge (Sa) of the tile, i.e., an edge of the rest face of the tile (P). The second point (m2) is positioned on the visible edge (Sv) of the visible face (f1) opposite the rest edge (Sa) of the first point (m1).

A third bending point (m3) and a fourth bending point (m4) are arranged at the ends of the third section (p3). The third point (m3) is positioned on the visible edge (Sv) of the visible face (f1) adjacent to that of the second point (m2), with respect to the same edge (E). The fourth point (m4) is positioned on the rest edge (Sa) of the rest face opposite the visible edge (Sv) of the third point (m3).

Depending on the profile of the tile (P) it is possible to identify a greater number of bending points, for example if the visible edge (Sv) has an imperfection or a non-point shape or if the tile has a bevel.

As already pointed out, the camera (4) is positioned so as to detect all the sections (p1,p2,p3) of the profile defined by the detection line (31), it is thus capable of detecting the bending points (m1,m2,m3,m4).

Furthermore, since the tile (P) is preferably in motion with respect to the laser beam (3) along the longitudinal direction (Y), the sections (p1,p2,p3) of the profile defined by the detection line (31), and the bending points (m1,m2,m3,m4), can be identified at one or more predetermined instants.

The identification of the bending points (m1,m2,m3,m4) allows to detect precise information on the actual conformation of the tile (P), and in particular on the presence of any defects in the edge area (E). For example, a detection in which the first and the second bending point (m1,m2) are not aligned along a line perpendicular to the resting plane (T), indicates that a defect is present on one of the corresponding edges (Sa,Sv). Similarly, for example, a detection in which the third and the fourth bending point (m3,m4) are not aligned along a line perpendicular to the resting plane (T), indicates that a defect is present on one of the corresponding edges (Sa,Sv).

In the preferred embodiment of the device, in which the resting plane (T) and the laser emitter (2) are a relative motion along the longitudinal direction (Y), the bending points (m1,m2,m3,m4) are identified at predetermined instants. For example, the bending points (m1,m2,m3,m4) are identified for each image or frame detected by the camera (4).

Thereby, since the tile (P) is in motion with respect to the laser beam (3) along the longitudinal direction (Y), the precise information on the actual shape of the tile (P), and in particular on the presence of any defects in the edge area (E), can be obtained for one or more points, defined at the predetermined instants in which the identification of the bending points is performed.

The detector device according to the present invention comprises a control module, arranged to receive the images and/or videos detected by the camera (4), to process the received images and to identify the bending points (m1,m2, m3,m4) at one or more predetermined instants. Preferably, the control module is arranged to compare the positions and to measure the distances between the bending points (m1, m2,m3,m4) of the detection line (31).

In essence, by means of an algorithm known in the sector, the control module processes the images and/or the videos received from the camera (4) and identifies in one or more predetermined instants the bending points (m1,m2,m3,m4), identifying them on the detection line (31). The identification of the bending points allows to obtain numerous structural information on the tile. For example, the control module, by means of the aforementioned algorithm, compares the positions of the bending points and measures the distances thereof. For example, the control module is provided with an algorithm which compares the positions of the bending points (m1,m2, m3,m4) of the actual tile with the positions of the bending points of a virtual model of the tile, and signals any deviations between the positions of the corresponding bending points. The detection of deviations can be used as an index for the presence of defects.

The detector device according to the present invention allows to obtain a particularly precise and effective measuring device for measuring the calibre of ceramic tiles.

The measuring device comprises at least four detector devices (10) according to the present invention, arranged on the same side of a common resting plane (T), i.e., the resting plane (T) for the tiles (P). The detector devices (10) are facing a detection area (S), located on the same side of the resting plane (T). In essence, the detection area (S) is a space within which to place a tile (P), so that the latter can be analysed by the measuring device.

Figure 4:
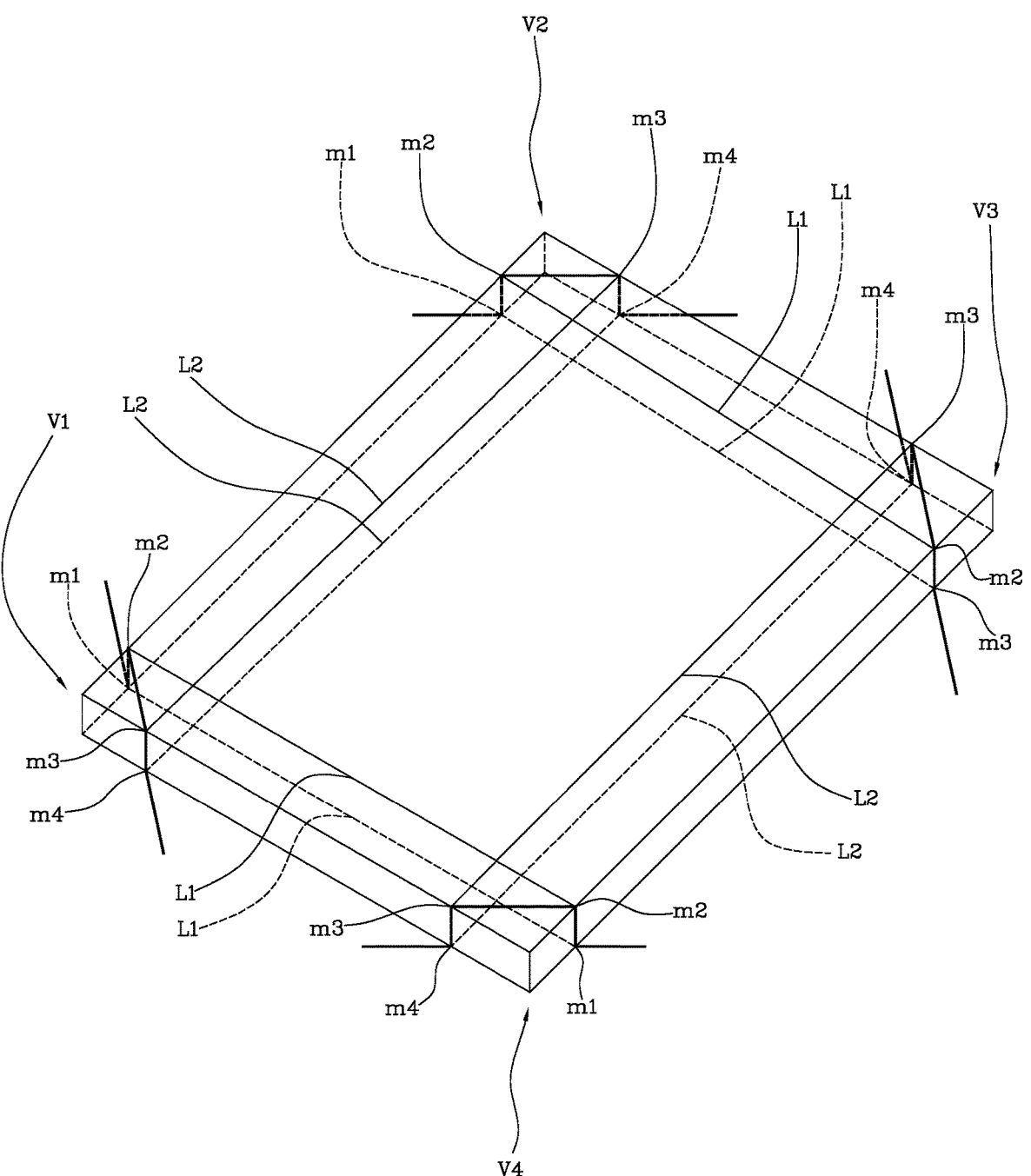
FIG. 4 shows an isometric view of a tile.

As schematically illustrated in FIGS. 1 and 4, each detector device (10) is placed so as to detect, in one or more predetermined instants and in the methods indicated above, the detection line (31) and the bending points (m1,m2,m3, m4) for a respective edge (E). That is, each detector device (10) is arranged so as to detect, for a respective corner (V1,V2,V3,V4) of the tile, the detection line (31) and the bending points (m1,m2,m3,m4) in one or more predetermined instants. In particular, each camera (4) is positioned so as to frame at least one portion of both side faces (f2,f3) adjacent to a respective edge (E).

In practice, each detector device (10) is positioned so as to face a respective corner (V1,V2,V3,V4) of a tile (P), when the latter is positioned in the detection area (S). A detector device (10) is intended as facing towards a respective corner (V1,V2,V3,V4) if, as already indicated, the vision cone (5) of the camera (4) is facing the resting plane (T) so as to include the detection line (31), i.e., if the camera (4) is arranged so as to frame at least one portion of both side faces (f2,f3) adjacent to the edge (E) of the framed corner. Furthermore, the laser emitter (2) is arranged so that the inclinations (a1,a2) of the laser beam (3) are such as to project a detection line (31) which strikes the tile (P) defining a profile comprising a first section (p1), arranged on a first side face (f2), a second section (p2), arranged on the visible face (f1), and a third section (p3), arranged on a second side face (f3) adjacent to the edge (E) of the framed corner.

In the depicted embodiment, the four detector devices (10) are arranged symmetrically, two by two, with respect to a first plane, containing the longitudinal direction (Y) and perpendicular to the resting plane (T), to a second plane, perpendicular to the first plane. Preferably, the four detector devices (10) are arranged at the vertices of a rectangle or a square, parallel to the resting plane (T).

In any case, the detector devices (10) could be arranged differently, as long as each of them can be understood as facing a respective corner of the tile (P), in the manner described above.

The measuring device comprises a control module, arranged to receive the images detected by the cameras (4), to process the images and/or the videos received and to measure the distances between some determined points of the detection lines (31) of the detector devices (10). In particular, the control module is arranged to receive the images and/or videos detected by each camera (4), to process the received images, to compare the positions and to measure the distances between the bending points (m1,m2, m3,m4) of the detection lines (31) at one or more predetermined instants.

In particular, at one or more predetermined instants, after identifying the bending points of each detection line (31), the control module measures the distances between pairs of homologous bending points which, in the case of a rectangular or square tile, are positioned on opposite sides. In practice, the control module measures the distances between the two pairs of first bending points (m1), positioned on rest edges (Sa) on opposite sides of the tile (P), obtaining two measurement values for a first dimension (L1) of the rest face of the tile (P). The control module further measures the distances between the two pairs of second bending points (m2), positioned on two exposed edges (Sv) of the tile (P), obtaining two measurement values for a first dimension (L1) of the exposed face (f1) of the tile (P).

Likewise, at one or more predetermined instants the control module measures the distances between the two pairs of third bending points (m3), positioned on two opposite exposed edges (Sv) of the tile (P), obtaining two measurement values for a second dimension (L2), perpendicular to the first dimension (L1), of the exposed face (F1) of the tile (P). Furthermore, the control module measures the distances between the two pairs of fourth bending points (m4), positioned on two opposite rest edges (Sa) of the tile (P), obtaining two measurement values for the second dimension (L2) of the rest face of the tile (P).

Once the measurements related to the first and to the second dimension (L1,L2) have been detected, the control module processes a significant measurement for each dimension. For example, the significant measurement is obtained as an average of the detected measurements. One or more further devices for detecting other measurements related to the first and to the second dimension (L1,L2), for example in a middle section of the tile (P), can be arranged to provide the control module with further measurements to be used for processing the significant measurement. To this end, one or more further detector devices (10) according to the present invention can be placed so as to project the respective detection lines (31) in the desired area of the tile, to define further bending points useful for detecting any further measurements sought.

In combination or as an alternative to the use of further detector devices (10), it is possible to process the images and/or videos acquired by the cameras (4) in order to identify further bending points, placed in different areas of the tile. In practice, as the tile advances, the detection lines (31), which remain stationary, are progressively crossed by the entire tile. The control module can be programmed so as to detect, in pre-set instants of time, further bending points positioned in pre-set areas of the tile, and precisely in pre-set areas of the rest edges (Sa) and the exposed edges (Sv) of the tile, for example about half of the edges (Sa,Sv) themselves. Such further bending points can be used, as already described, to obtain further measurements of the first and of the second dimension (L1,L2).

In addition to the attribution of the calibre, each tile can be attributed, again by the control module, an index related to the presence of defects, which can be detected in the methods described above, in the presence of any misalignment between the bending points (m1,m2,m3,m4) identified at one or more predetermined instants.

The significant measurements processed by the control module for the first and the second dimension (L1,L2) can be used to define the calibre of the tiles (P). In turn, the calibre can be used to sort the tiles automatically, so as to group the tiles with the same or very similar calibre together. To this end, the calibre of each tile can be communicated to an automatic sorting device, known in the sector, such as the device described in publication EP3165483.

The detector device according to the present invention is substantially based on the following detection method, performed on a tile (P), arranged on a resting plane (T), comprising at least one edge (E) at which two exposed edges (Sv) and two rest edges (Sa) join.

The method includes projecting a flat laser beam (3) towards the tile (P), so as to illuminate a detection line (31) extending on the resting plane (T) and on the tile (P) and intersecting the exposed edges (Sv) and the rest edges (Sa).

The method then includes detecting an image of bending points (m1,m2,m3,m4) in which the detection line (31) intersects the exposed edges (Sv) and the rest edges (Sa) of the tile (P). Subsequently, the method includes processing the image of the bending points (m1,m2,m3,m4) to define a data related to the position of each bending point. The position data of each bending point are then compared with each other and/or are compared with the position data of the corresponding bending points of a virtual model of the tile (P), to define a significant status information of the quality and/or size of the tile (P).

Preferably, the method includes carrying out a relative motion between the resting plane (T) and the laser emitter (2), so that the tile (P) progressively crosses the detection line (31). The method then includes detecting one or more images, in one or more predetermined instants of time, of the bending points (m1,m2,m3,m4) in which the detection line (31) intersects the exposed edges (Sv) and the rest edges (Sa) of the tile (P). Subsequently, the method includes processing each image of the bending points (m1,m2,m3,m4) to define a data related to the position of each bending point. That is, the method can be repeated for a pre-set number of distinct instants of time within a time interval in which said detection line (31) intersects said visible edges (Sv) and said rest edges (Sa).

If a rectangular or square tile, provided with four corners (v1,v2,v3,v4) each comprising an edge (E), the method may be applied to each corner (v1,v2,v3,v4) of the tile (P). The position data of the bending points (m1,m2,m3,m4) of each edge (E) are compared with the position data of the bending points (m1,m2,m3,m4) of the adjacent edges (E), to obtain one or more measurements relative to a first dimension (L1) of the tile and to a second dimension (L2) of the tile.

As already mentioned, preferably the resting plane (T) is movable along the longitudinal direction (Y). Both the detector device and the measuring device can operate with the resting plane (T), and the tiles (P) arranged resting thereon, in continuous advancement motion. In a known manner in the sector, the control module is in fact able to isolate or extrapolate from the images and/or videos acquired by the camera(s) (4) at least one image, taken at an instant of time or in a predetermined position, from which to identify the bending points (m1,m2,m3,m4).

In practice, the control module, by means of its own algorithm, is arranged to control, through the cameras (4) used, the acquisition of an image of a tile (P), moving on the resting plane (T) along the longitudinal direction (Y), as far as the latter is in a pre-set position with respect to the detection line(s) (31). In such a case, the tiles (P) can be positioned on the resting plane (T) consecutively to each other, so as to be led by the latter to the detector devices used, and in particular to the measuring device, transiting through the detection area (S).

The invention claimed is:

1. A detector device for ceramic tiles or slabs, the detector device comprises a resting plane (T), provided with a longitudinal direction (Y) and movable along said longitudinal direction (Y);

a laser emitter (2), arranged to emit a flat laser beam (3) on the resting plane (T), so as to illuminate a detection line (31) on the resting plane (T); the laser beam (3) lies on a plane having a first inclination (a1) with respect to the transport plane (T); the laser beam (3) has a second inclination (a2) with respect to the longitudinal direction (Y);

a camera (4), provided with a vision cone (5) having a longitudinal axis (X), which longitudinal axis (X) has an inclination (b) with respect to the transport plane (T); the vision cone (5) faces the transport plane (T) so as to include the detection line (31);

the laser emitter (2) and the camera (4) are located on the same side of the transport plane (T) and along the same longitudinal axis (X);

a control module, arranged to receive images or videos detected by the camera (4), to process the received images and to identify, at one or more predetermined instants of time, bending points (m1,m2,m3,m4) of the detection line (31) on edges (Sa, Sv) of a tile (P) arranged on the transport plane (T), wherein the control module is arranged to compare the positions and to measure the distances between the bending points (m1,m2,m3,m4) of the detection line (31).

2. The detector device according to claim 1, wherein the first inclination (a1) of the laser beam (3) is different from 90°.

3. The detector device according to claim 1, wherein the second inclination (a2) of the laser beam (3) is different from 90°.

4. The detector device according to claim 1, wherein the inclination (b) of the longitudinal axis (X) is different from 90°.

5. The detector device according to claim 1, wherein the longitudinal axis (X) of the vision cone (5) has, on the resting plane (T), a second inclination (b2) with respect to the longitudinal direction (Y), and wherein the second inclination (b2) is different from 90°.

6. A measuring device, for measuring the calibre of ceramic tiles or slabs, comprising at least four detector devices (10), each of the four detector devices (10) comprising a resting plane (T), provided with a longitudinal direction (Y) and movable along said longitudinal direction (Y);

a laser emitter (2), arranged to emit a flat laser beam (3) on the resting plane (T), so as to illuminate a detection line (31) on the resting plane (T); the laser beam (3) lies on a plane having a first inclination (a1) with respect to the transport plane (T); the laser beam (3) has a second inclination (a2) with respect to the longitudinal direction (Y);

a camera (4), provided with a vision cone (5) having a longitudinal axis (X), which longitudinal axis (X) has an inclination (b) with respect to the transport plane (T); the vision cone (5) faces the transport plane (T) so as to include the detection line (31);

the laser emitter (2) and the camera (4) are located on the same side of the transport plane (T) and along the same longitudinal axis (X);

the at least four detector devices (10) arranged on the same side of a common resting plane (T) and facing a detection space(S) placed on the same side of the resting plane (T), and a control module, arranged to receive the images and/or videos detected by the cameras (4), to process the images and/or videos received and measure the distances between some bending points (m1,m2,m3,m4) of the detection lines (31) of the detector devices (10).

7. A detection method, for detecting size and/or status information of a tile (P), arranged on a resting plane (T), comprising at least one edge (E) at which two exposed edges (Sv) and two rest edges (Sa) join, comprising the following steps:

preparing a laser emitter (2) suitable for projecting a laser beam (3) towards the tile (P);

activating the resting plane (T) and the laser emitter (2) in relative motion along a longitudinal direction (Y);

projecting a laser beam (3) towards the tile (P), so as to illuminate a detection line (31) extending on the resting plane (T) and on the tile (P) and intersecting the exposed edges (Sv) and the rest edges (Sa);

at a pre-set instant of time, detecting an image of bending points (m1,m2,m3,m4) in which the detection line (31) intersects the exposed edges (Sv) and the rest edges (Sa);

processing the image of the bending points (m1,m2,m3, m4) to define a data relative to the position of each bending point.

8. The method according to claim 7, comprising a step of comparing the position data of each bending point and/or comparing the position data of each bending point with the position data of the corresponding bending points of a virtual model of the tile (P), to define a significant status information of the tile quality and/or size.

9. The method according to claim 7, wherein the method is repeated for a pre-set number of distinct instants of time within a time interval in which said detection line (31) intersects said visible edges (Sv) and said rest edges (Sa).

10. The method for measuring the calibre of ceramic tiles, provided with two or more corners (v1,v2,v3,v4) each comprising an edge (E), comprising the following steps:

applying the method according to claim 8 to each corner (v1,v2, v3, v4) of the tile (P);

comparing the position data of the bending points (m1, m2,m3,m4) of each edge (E) with the position data of the bending points (m1,m2,m3,m4) of the adjacent edges (E), to obtain one or more measurements relative to a first dimension (L1) of the tile and a second dimension (L2) of the tile.

11. The detector device according to claim 1, wherein the camera (4) is configured to detect a portion of a visible face (f1) and of two side surfaces (f2, f3) of a tile (P) arranged on the resting plane (T).

* * * * *